(12) United States Patent
Pascal et al.

(10) Patent No.: US 10,257,148 B2
(45) Date of Patent: *Apr. 9, 2019

(54) SCALABLE MESSAGE FIDELITY

(71) Applicant: RCS IP, LLC, Waco, TX (US)

(72) Inventors: Kristin Marie Pascal, Kirkland, WA (US); Andrew Evan Klonsky, Portland, OR (US); Matthew James Bailey, Seattle, WA (US)

(73) Assignee: RCS IP, LLC, Waco, TX (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/147,837

(22) Filed: May 5, 2016

(65) Prior Publication Data

US 2016/0248715 A1   Aug. 25, 2016

Related U.S. Application Data

(63) Continuation of application No. 14/698,801, filed on Apr. 28, 2015, now Pat. No. 9,356,900, which is a (Continued)

(51) Int. Cl.
*H04W 4/12* (2009.01)
*H04W 4/14* (2009.01)
(Continued)

(52) U.S. Cl.
CPC .............. *H04L 51/24* (2013.01); *G10L 13/08* (2013.01); *G10L 15/26* (2013.01); *H04L 51/063* (2013.01);
(Continued)

(58) Field of Classification Search
CPC ......... H04M 1/72547; H04M 1/72583; H04M 1/72561; G06F 3/04817; G06F 3/04842; G06F 3/0488; G06F 3/1454; G06F 2203/04806; G06F 3/14; H04N 21/482; H04N 21/4312; H04N 21/4314;
(Continued)

(56) References Cited

U.S. PATENT DOCUMENTS 5,880,731 A   3/1999 Liles
5,894,305 A   4/1999 Needham
(Continued)

FOREIGN PATENT DOCUMENTS

WO   2005067327 A1   7/2005

OTHER PUBLICATIONS http://slfix.com/?p=658. Retrieved Feb. 20, 2009.
(Continued)

*Primary Examiner* — Nizar N Sivji
(74) *Attorney, Agent, or Firm* — Knobbe, Martens, Olson & Bear, LLP

(57) ABSTRACT

Message content is scaled to support rich messaging. Devices and associated messaging systems can support various levels of content richness or fidelity. Message content scaling is employed to ensure sharing of content in as rich a manner as possible given limitations associated with various messaging systems, among other things. Messages can be scaled down or degraded, for instance where communicating devices do not support high fidelity content being transmitted. Alternatively, messages can be scaled up or enriched in cases, where low fidelity content is transmitted to a device supporting richer content, for example.

19 Claims, 13 Drawing Sheets

Related U.S. Application Data continuation of application No. 14/193,753, filed on Feb. 28, 2014, now Pat. No. 9,049,163, which is a continuation of application No. 12/342,838, filed on Dec. 23, 2008, now Pat. No. 8,700,072.

(51) Int. Cl.
| | | |
|---|---|---|
| H04L 29/08 | (2006.01) | |
| H04L 12/58 | (2006.01) | |
| H04N 19/40 | (2014.01) | |
| G10L 13/08 | (2013.01) | |
| G10L 15/26 | (2006.01) | |

(52) U.S. Cl.
CPC ............ *H04L 51/066* (2013.01); *H04L 51/10* (2013.01); *H04L 51/34* (2013.01); *H04L 51/38* (2013.01); *H04N 19/40* (2014.11); *H04W 4/12* (2013.01); *H04L 67/02* (2013.01); *H04W 4/14* (2013.01)

(58) Field of Classification Search
CPC ............ H04N 21/47; H04N 21/47214; H04N 21/42209; H04L 67/08; G09G 2340/02; G09G 2340/045; G09G 2340/0492; G09G 2340/145
See application file for complete search history.

(56) References Cited

U.S. PATENT DOCUMENTS

| | | | |
|---|---|---|---|
| 6,061,659 | A | 5/2000 | Murray |
| 6,177,931 | B1 | 1/2001 | Alexander |
| 6,434,604 | B1 | 8/2002 | Harada |
| 6,731,688 | B1 | 5/2004 | Johnson |
| 7,086,005 | B1 | 8/2006 | Matsuda |
| 7,124,164 | B1 | 10/2006 | Chemtob |
| 7,218,943 | B2 | 5/2007 | Klassen |
| 7,343,561 | B1 | 3/2008 | Stochosky et al. |
| 7,386,799 | B1 | 6/2008 | Clanton |
| 7,392,288 | B2 | 6/2008 | Kanagawa |
| 7,421,690 | B2 | 9/2008 | Forstall |
| 2003/0228909 | A1 | 12/2003 | Tanaka |
| 2004/0148400 | A1 | 7/2004 | Mostafa |
| 2004/0260756 | A1 | 12/2004 | Forstall |
| 2005/0004985 | A1 | 1/2005 | Stochosky |
| 2005/0004995 | A1 | 1/2005 | Stochosky |
| 2006/0052091 | A1 | 3/2006 | Onyon et al. |
| 2006/0066639 | A1 | 3/2006 | Iwaki |
| 2006/0160576 | A1 | 7/2006 | Matsuoka |
| 2006/0167992 | A1 | 7/2006 | Cheung et al. |
| 2006/0277271 | A1 | 12/2006 | Morse |
| 2007/0152979 | A1 | 7/2007 | Jobs |
| 2007/0156910 | A1 | 7/2007 | Christie |
| 2007/0249385 | A1 | 10/2007 | Doi et al. |
| 2007/0274400 | A1 | 11/2007 | Murai et al. |
| 2008/0004073 | A1 | 1/2008 | John et al. |
| 2008/0034037 | A1 | 2/2008 | Ciudad |
| 2008/0034038 | A1 | 2/2008 | Ciudad |
| 2008/0034315 | A1 | 2/2008 | Langoulant |
| 2008/0055269 | A1 | 3/2008 | Lemay |
| 2008/0094368 | A1 | 4/2008 | Ording |
| 2008/0094369 | A1 | 4/2008 | Ganatra |
| 2008/0165148 | A1 | 7/2008 | Williamson |
| 2009/0103899 | A1 | 4/2009 | Lessing |
| 2009/0320077 | A1 | 12/2009 | Gazdzinski |
| 2011/0029373 | A1 | 2/2011 | Steelberg et al. |

OTHER PUBLICATIONS http://extratorrent.com/torrentl9051981Text+Message+to+TV+Screen+by+Fire Text.html. Retrieved Feb. 20, 2009.
http://mooseyard.com/Jens/2005/06/little-boxes-of-wordsl. Retrieved Feb. 20, 2009.
http://www.techcrunch. com/2006/09/27/a-look-at-eight -multi-person-sms-servicesl Retrieved Feb. 20. 2009.
http://www.labnol.org/internet/google-sms-subscribe-rss-via-sms/ 47261/Retrieved Feb. 20, 2009.
http://www.txtblaster.com/ Retrieved Feb. 20, 2009.
http://www.eztexting.com/ Retrieved Feb. 20, 2009.
http://in.content.mobile.yahoo.com/new/groups.tour3.html Retrieved Feb. 20, 2009.
http://www.sendgroupsms.com/ Retrieved Feb. 20, 2009.
http://www.jabber.org.au/ichat Retrieved Feb. 20, 2009.
http://www.mac.com/1/images/ichat_screeshot1_20051012.jpg Retrieved Feb. 20, 2009.
http://www.textually.org/textually/archives/2007/12/018249.htm Retrieved Feb. 20, 2009.
http://www.macupdate.com/info.php/id/24959 Retrieved Feb. 20, 2009.
Office Action dated Sep. 15, 2014 for U.S. Appl. No. 14/193,753, 39 pages.
Office Action dated Sep. 29, 2015 for U.S. Appl. No. 14/698,801, 41 pages.
Office Action dated Feb. 2, 2012 for U.S. Appl. No. 12/342,838, 20 pages.
Office Action dated Sep. 29, 2011 for U.S. Appl. No. 12/342,838, 35 pages.
Office Action dated Nov. 1, 2012 for U.S. Appl. No. 12/342,838, 26 pages.
Office Action dated Aug. 14, 2013 for U.S. Appl. No. 12/342,838, 39 pages.
Office Action dated Jun. 6, 2012 for U.S. Appl. No. 12/342,838, 28 pages.
Office Action dated Mar. 21, 2013 for U.S. Appl. No. 12/342,838, 37 pages.
http://news.cnet.com/8301-13579_3-9962739-37.html Retrieved Feb. 20, 2009.
http://modmyi.com/forums/new-skins-themes-launches/4610-sms-balloon-collection.html Retrieved Feb. 20, 2009.
http://farm2.static.ftickr.com/1321/1352786329_808877273e_o.png Retrieved Feb. 20, 2009.
http://mooseyard .coml Jens/wp-contentluploads/2008/03/balloon-chat-ui-21-april-1997.png. Retrieved Feb. 20, 2009.
http://www.dbug.org/publications/articles/ichat_1_review.shtml Retrieved Feb. 20, 2009.
http://iphone.cazisoft.coml?paged=11 Retrieved Feb. 20, 2009.
http://www.mysupergroups.com/tour Retrieved Feb. 20, 2009.
http://www.mysupergroups.com/faqs Retrieved Feb. 20, 2009.
http://www.cssplay.co.uklmenu/bubbles Retrieved Feb. 20, 2009.
http://www.testiphone.com/. Retrieved on Feb. 20, 2009.
http://www. tatango.com/tatango/detai ls. Retrieved on Feb. 20, 2009.
http://www.smsgupshup.com/help. Retrieved on Feb. 20, 2009.
http://www. intomobi le. com/2007/12/07/change-your -iphones-sms-text -message-bubbles-to-a-malte-finish-iphone-.
http://www.youtube.com/watch?v=VDnzgvRh6Xk. Retrieved on Feb. 20, 2009.
http://www.eztext.coml. Retrieved on Feb. 20, 2009.
http://www.faculty.idc.ac.il/arikIIMRet-All.mov. Retrieved on Feb. 20, 2009.
http://www.iminent.com/default.aspx. Retrieved on Feb. 20, 2009.
http://www.youtube.com/watch?v=rliqNvybcR4. Retrieved on Feb. 20, 2009.
http://www.slashphone.com/xumii-launches-first-social-address-book-for-mobile-phones-at-demofall-08-212021, Retrieved Feb. 20, 2009.
http://www.xumiLcom/ Retrieved Feb. 20, 2009.
http://www.apple.com/macosxlfeatures/ichat.html Retrieved Feb. 20, 2009.
http://www.apple.com/macosxlfeatures/300.html#ichat Retrieved Feb. 20, 2009.
http://www.flick.com/photos/rmohns/1752400601/ Retrieved Feb. 20, 2009.
http://en.wikipedia.org/wiki/Ichat Retrieved Feb. 20, 2009.
http://www. techcrunch.com/2007/08/15/most-useful-iphone-site-yet-meebol Retrieved Feb. 20, 2009.

(56) References Cited

OTHER PUBLICATIONS http://www.appsafarL.com/utilities/837/beejive-im/ Retrieved Feb. 20, 2009.
http://www.boygeniusreport.com/gallery/handsets/beejive-for-iphonel Retrieved Feb. 20, 2009.
http://www.ilounge.com/index.php/articles/comments/iphone-gems-the-best-instant-messaging-apps Retrieved Feb. 20, 2009.
http://www.iphonehacks.com/2007/08/iphone-mundu-im.html Retrieved Feb. 20, 2009.
http://www.iphonehacks.com/2007/07/iphone-trillian.html Retrieved Feb. 20, 2009.
http://www.group2call.com/ Retrieved Feb. 20, 2009.
http://www.appsafari.com/chat/1452/group2call Retrieved Feb. 20, 2009.
http://twitter.com/ Retrieved Feb. 20, 2009.
http://www.sweetim.com/ Retrieved Feb. 20, 2009.
http://www.openwave.com/us/news_room/press_releases/2002/20020319 OpWV mmsandsms 0319. htm. Retrieved Feb. 20, 2009.
www.3jam.com. Retrieved Feb. 20, 2009.
http://mashable.com/2007/09/20/virgin-mobile-3jaml. Retrieved Feb. 20, 2009.
http://news.cnet.com/8301-13580_3-9768707-39.html. Retrieved Feb. 20, 2009.
http://ajaxpatterns.org/Predictive_Fetch. Retrieved Feb. 20, 2009.
http://help.yahoo.com/tutorials/cg/mail/cg_chatadv2.html. Retrieved Feb. 20, 2009.
http://www.talkshoe.com/se/abouTSAbout.html. Retrieved Feb. 20, 2009.
http://en.wikipedia.org/wiki/Second_Life. Retrieved Feb. 20, 2009.
http://www.whyville.net/smmklnice. Retrieved Feb. 20, 2009.
http://www.there.com/whatisThere.html. Retrieved Feb. 20, 2009.

SCALABLE MESSAGE FIDELITY

CROSS-REFERENCE TO RELATED APPLICATION

This application is a continuation of, and claims priority to each of, U.S. patent application Ser. No. 14/698,801, filed on 28 Apr. 2015, and entitled "SCALABLE MESSAGE FIDELITY," which is a continuation of U.S. patent application Ser. No. 14/193,753, filed on 28 Feb. 2014, and entitled "SCALABLE MESSAGE FIDELITY," now issued as U.S. Pat. No. 9,049,163, which is a continuation of U.S. patent application Ser. No. 12/342,838, filed on Dec. 23, 2008 and entitled "SCALABLE MESSAGE FIDELITY," now issued as U.S. Pat. No. 8,700,072. The entireties of the above noted applications and patent are hereby incorporated by reference herein.

BACKGROUND

Technology seeks to aid human communication. Communication is a process that includes a sender and a receiver who converse over some medium. There are two main types of communication of which technology conventionally assists namely verbal and written communication. For example, traditional telephones are devices utilized to transmit and receive sound or more specifically voice communication amongst participants. This swung communication away from handwritten letters to telephonic voice communication. The advent of computers and the Internet brought written communication back in vogue by way of e-mail (electronic mail) and instant messaging (IM). Further, development of mobile communication devices offers support for voice and written capability utilizing SMS (Short Messaging Service) and/or MMS (Multimedia Messaging Service), for instance.

E-mail is a store-and-forward style technology for written electronic communication. E-mail systems provide facilities for sending, receiving, and transmitting messages electronically, among other things. Messages can be entered utilizing a text editor and addressed to recipients utilizing a related e-mail address. Such messages can then be saved in a sender's mailbox, sent across a network such as the Internet to a message server, and subsequently pushed or forwarded to a recipient's mailbox. While e-mail is fast and reliable, it is also a very flexible communication means. For example, in addition to written text, it can also include pictures, audio, and/or links to websites, among other things.

IM (Instant Messaging) is a form of real-time communication or chatting amongst individuals using typed text, among other things. Computers or other devices connected to a network such as the Internet can facilitate communication in this manner. In general, IM differs from e-mail in that text messages appear before users in substantially real-time or instantly. Messages sent to individuals who are not on-line and/or connected to the service cannot be completed. However, some systems have been developed that allow messages to be sent to off-line individuals thereby blurring the distinction between IM and e-mail.

SMS (Short Messaging Service) is a communication protocol that enables short text messaging between mobile communications devices. SMS is a hybrid e-mail—IM technology for mobile devices such as phones. Like e-mail, SMS is a store-and-forward technology. Messages are sent and received utilizing a message service center that acts as an intermediary between senders and recipients. Further, messages are limited to text messages and in particular short messages. In addition, the speed at which text messages are delivered, if at all, can be affected by inherent connectively issues such as where a user has a poor communication signal or is out of range.

MMS (Multimedia Messaging Service) is an extension to SMS to enable multimedia objects such as images and audio to be sent amongst mobile communication devices. MMS messages are sent in a similar fashion as SMS messages except that multimedia content is first encoded and inserted in a manner analogous to e-mail. Like SMS, however, MMS is not the same as e-mail since it is based multimedia messaging concepts where messages are afforded in accordance with a presentation file, among other things.

The above noted messaging technologies are distinct for the most part. For example, e-mail and IM are confined to computers while SMS and MMS are associated with mobile devices. Nevertheless, some devices, such as so-called smart phones, are essentially small handheld computers with phone capabilities. Accordingly, smart phones can enable use of both technologies but through different supporting infrastructure. For instance, a user can text message using SMS or via IM by logging in through a web browser.

DETAILED DESCRIPTION

Systems, methods, apparatuses, and the like pertaining to scalable message fidelity are described in detail hereinafter. Messaging systems and/or associated communication devices can support varying levels of content richness or fidelity. Rather than baring communication between different systems, scaling of messages or message content can be employed to ensure communication in as rich a manner as supported, among other things. Accordingly, messages or portions thereof can be scaled down or degraded, or scaled up or enriched. In other words, message fidelity is scalable.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

In one or more embodiments, the subject disclosure pertains to scaling message richness or fidelity. Differences can exist between the richness of a message and support by a receiving device and/or messaging system. Further, the difference can be in either direction. For instance, a message can be richer than a device supports or support can be provided for richer content than a message provides. Fidelity scaling can be employed to bridge this gap and facilitate communication. Further, communication can be aided by notifying a sender and/or receiver that a composed message is not the same as that rendered to a recipient to avoid confusion, among other things.

In accordance with one aspect of the disclosure, scaling can be employed to map high fidelity messages produced by a rich message system to legacy devices. By way of example and not limitation, audio can be converted to text; video can be transformed to a series of still images with optional text; or a webpage, map, or image can be replaced by a link thereto alone or in combination with descriptive text.

Figure 1:
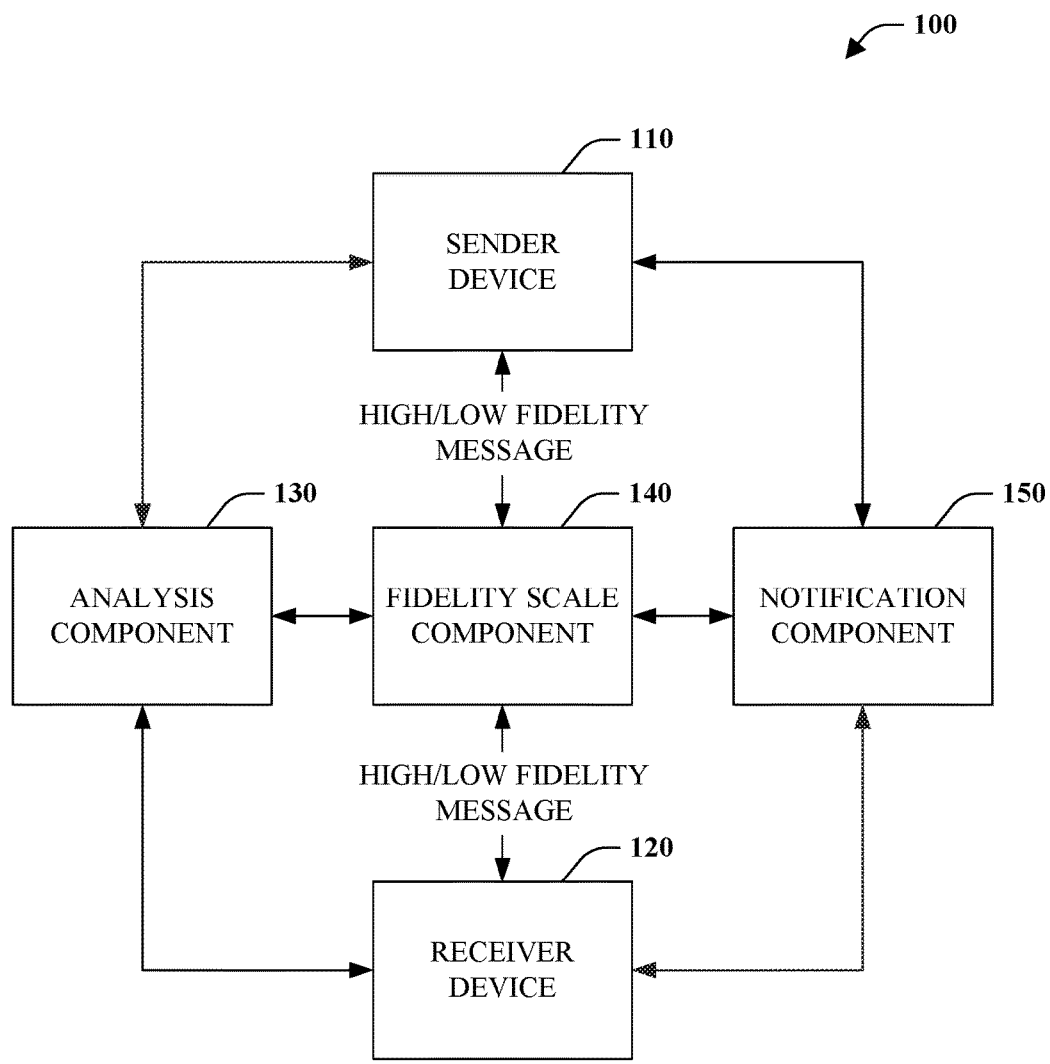
FIG. 1 is a block diagram of a scalable message system in accordance with an aspect of the disclosed subject matter.

Referring initially to FIG. 1, a scalable message system 100 is illustrated in accordance with an aspect of the claimed subject matter. The system 100 includes a sender device 110 and a receiver device 120. Of course, a single device can be both a sender at a receiver at different times, but are delineated here for purposes of explanation. Sender device 110 and/or associated messaging system or subsystem, can transmit a message electronically to a target or receiver device 120 and/or associated messaging system or subsystem (not shown). Although not limited thereto, in accordance with one aspect, the message can correspond to a thread style message that is communicated substantially in real-time or instantaneously. The richness or fidelity of the transmitted message can vary, for example as a function of support provided by the sender device 110. Similarly, the receiver device 120 can support different levels of message richness. Accordingly, a sort of messaging impedance mismatch can occur. By way of example and not limitation, consider a simple situation in which a sender device includes integrated support for MMS and a receiver device supports SMS and not the multimedia extension. As a result, the receiver device 120 does not have native support for pictures, audio, and/or video that can be transmitted by the sender device 110. Analysis component 130 and fidelity scale component 140 operate to facilitate rich communication amongst the sender device 110 and receiver device 120 in this context.

The analysis component 130 performs analysis to determine, infer, or otherwise identify messaging capabilities of the receiver device 140. For instance, the device itself can be interrogated, information can be gathered about capabilities from a third party (e.g., manufacturer, service provider, social networks . . . ), or previous interactions can be analyzed. Furthermore, inferences can be made with respect to a manufacturer of a device and/or type or style of device, amongst other contextual factors. It should be further appreciated that the analysis component 130 can be communicatively coupled to the sender device 110 to aid discovery of capabilities thereof. However, since all or anyone of those capabilities may or may not be employed with respect to a message, processing can be left to the fidelity scale component 140. Additionally or alternatively, the analysis component 130 can analyze messages as they are composed and subsequently sent.

The fidelity scale component 140 or simply scale component 140 transforms or scales messages to a receiver device supported level of message richness. Based on information from the analysis component 130 regarding messaging support as well as a message itself, scaling can occur.

Scaling can be multidirectional. In particular, a message or message content can be scaled down or scaled up. In other words, message content can be degraded or enriched. For example, if the sender device 110 produces a rich or high fidelity message and the receiver device 120 does not support that level of richness, the message can be scaled down or degraded. Alternatively, if a low fidelity message is afforded by the sender device 110 and the receiver device 120 supports greater message fidelity, then the message can be scaled up or enriched. Of course, where the sender and receiver devices 110 and 120, respectively, support the same level of message richness, the message can simply pass through the scale component 140 without augmentation.

In accordance with one embodiment, the sender device 110 and associated messaging system can support a high level of message richness or fidelity, while the receiver devices 120 are legacy devices that support lower levels or richness. In this manner, the messages can be scaled to facilitate interaction with legacy devices. For instance, the message can include a combination of SMS, MMS, IM, and/or email type features that are transmitted across SMS and/or IP backbones to mobile devices. In particular, messages can be grouped into conversations between participants including conversation bubbles capturing a message. Moreover, the messages can include text, images, audio, video, emoticons, maps, and/or websites, among other things. In other words, messaging need not be confined to simple text or multimedia supported by MMS. For example, an actual web page can form part of a message sent not just a link thereto. A receiver or legacy device 120 can support at most a subset of such messaging content. Scaling can be employed to facilitate conversation between devices that support different messaging content or message richness/fidelity.

According to one aspect of the claimed subject matter, message scaling can be performed intelligently. For instance, messages can be scaled up to a maximum level or richness or fidelity supported by a receiver device 120. In other words, scaling can seek to ensure messages are as rich as possible given particular support. Rather than refusing to accept or transmit a message with unsupported content or simply stripping such content from the message, a scaled message can seek to leverage available support to facilitate conversation. By way of example, not limitation, consider a scenario in which a message is sent with an embedded web page therein. Based on support provided by the receiver device 120, the message or content can be scaled in different ways. Where a device simple supports text, the message can be scaled to include the web page URL (Uniform Resource Locator) as well as some text describing the webpage such as the title as well as various content and or metadata to facilitate participation in a conversation. Alternatively, if the device also supports embedded picture messages, an image of the web page can be sent alone or in conjunction with the URL and descriptive text information.

Notification component 150 is communicatively coupled to the fidelity scale component 140 as well as the sender device 110 and the receiver device 120. As the name suggests, the notification component 150 can notify or otherwise inform a message sender and/or receiver when a message has be scaled or transformed by the scale component 140. For instance, a user of substantially antiquated device with respect to messaging technology can be notified when the message received was scaled. A sender of the message can also be similarly informed. Such notification can simply note the fact that the message was scaled and/or identify specific alterations made during the scaling process. In one implementation, notification can be embodied in or as part of a message. For example, a received message can include text and/or a signal indicative scaling. The sender could then receive a receipt or additional message that scaling was performed, among other things. In any event, notification can facilitate conversation by alerting communicating parties that the message received is not of the same as the message sent, consequently avoiding any confusion that may have otherwise occurred. To that end, an actual description of the scaling further helps. For example, a notification can indicate that a picture was removed and replaced with a URL and/or descriptive text.

Figure 2:
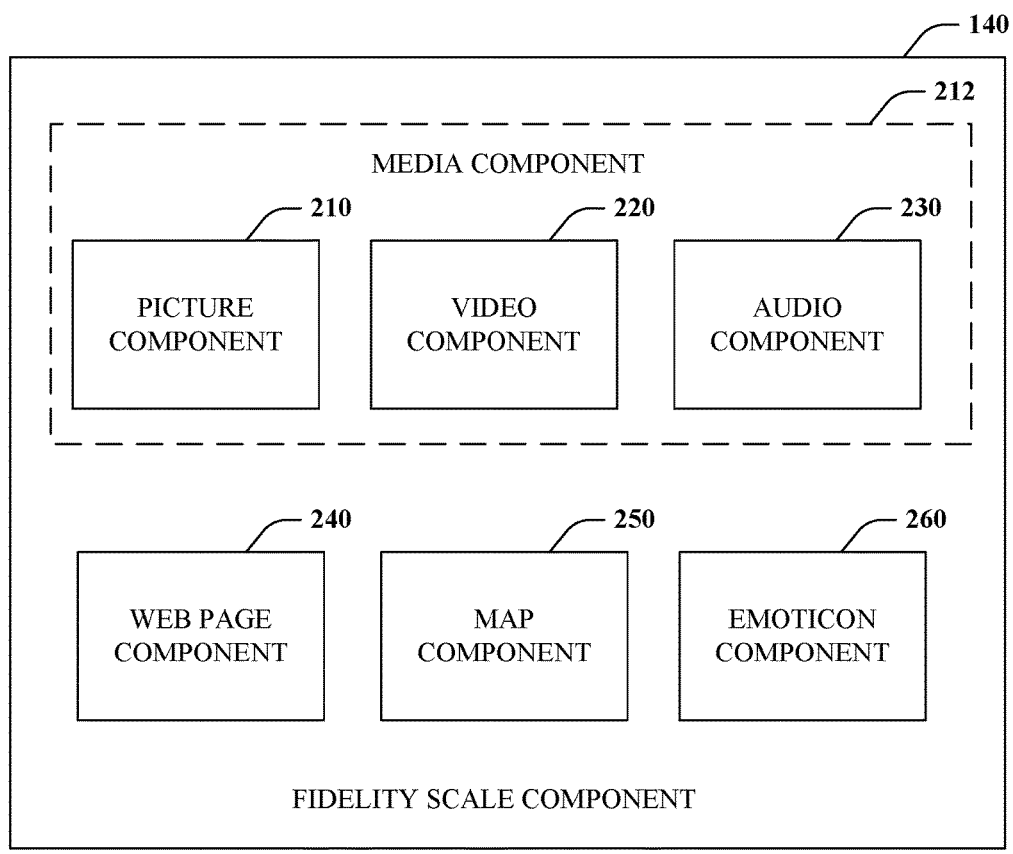
FIG. 2 is a block diagram of a representative scale component according to an aspect of the disclosure.

Turning attention to FIG. 2, a representative scale component 140 is illustrated in accordance with an aspect of the claimed subject matter. As shown, the scale component 140 includes a plurality of sub-components for processing various types, kinds, and/or categories of message content. In particular, the scale component includes picture component 210, video component 220, audio component 230, which can also simply be referred to as a media component 212, a webpage component 240, a map component 250, and emoticon component 260. Although not limited thereto, each of these components or subcomponents provides unique functionality with respect to scaling a specific type of message content. Further, the components can operate alone or in combination as will be described further infra.

Figure 3:
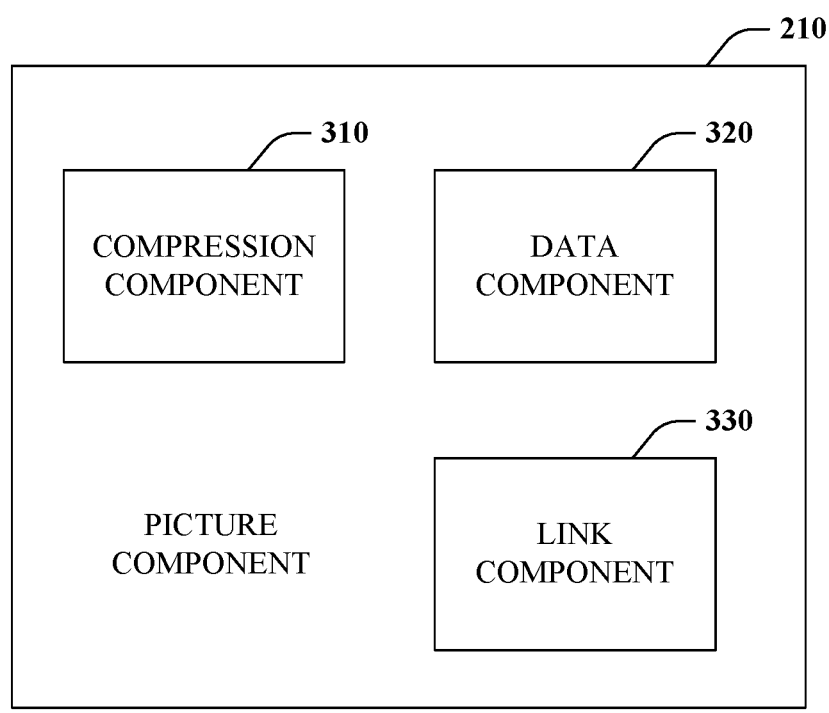
FIG. 3 is a block diagram of an exemplary picture component in accordance with a disclosed aspect.

Referring to FIG. 3, an exemplary picture component 210 is depicted in accordance with an aspect of the claimed subject matter. The picture component 210 can handle scaling with respect to various types of images or pictures embedded within a message. Compression component 310 is a mechanism for compressing or decompressing an image. Some messaging systems associated with devices can place a limitation on the size of images. The compression component 310 can employ various known and/or novel compression/decompression technologies to enable size limitations to be respected, among other things. Data component 320 can extract and/or inject descriptive data associated with an image. For instance, a picture title and metadata associated with an image can be extracted and employed to describe an embedded picture where such picture is unable to be displayed based on message content limitations. Alternatively and where available, data can be injected, for example by adding or augmenting image metadata. Link component 330 is a mechanism for injecting and/or expanding URLs or other links to images. In one case, an image can be replaced with a URL where images are not supported. On the other hand, if a URL is embedded in a message sent to a device that supports images, the URL can be up-scaled and the URL swapped with the image it identifies.

Figure 4:
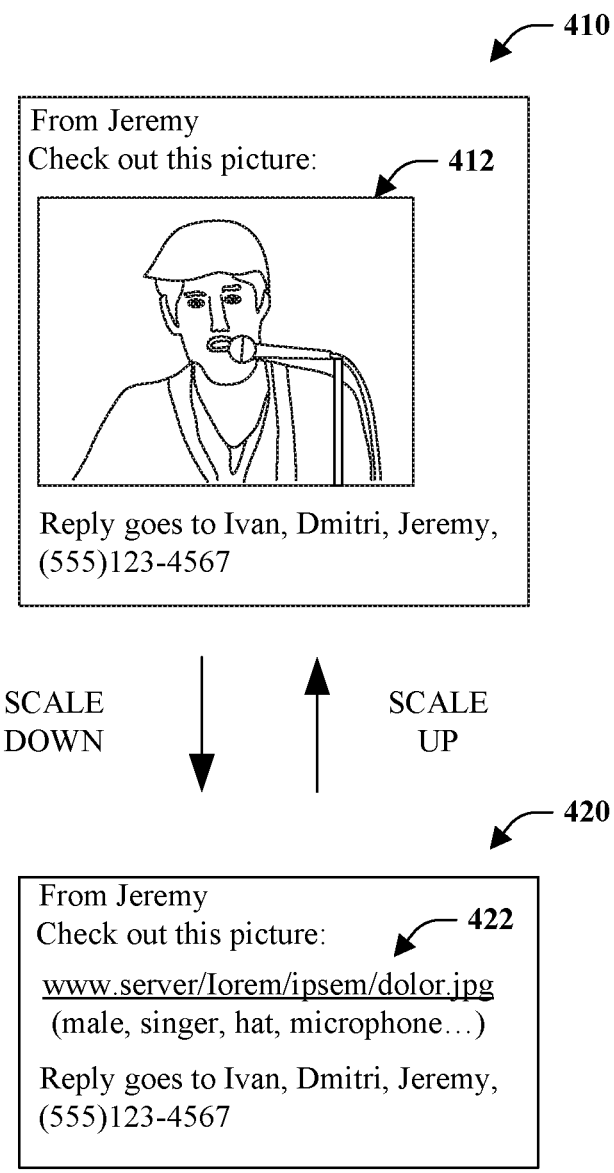
FIG. 4 is a graphical representation of picture scaling in accordance with a disclosed aspect.

FIG. 4 depicts an exemplary picture scaling according to a claimed aspect. Two messages 410 and 420 are shown. The message 410 includes an embedded picture 410. Where this is the message transmitted to a device that does not support pictures, the message can be scaled down to the message 420. Here, the picture is replaced with a URL that can be utilized to download or otherwise view the picture as well as some descriptive data associated with the image. By contrast, if the message 420 is transmitted from a device that does not support pictures to one that does, the message can be scaled up. In particular, a picture can be substituted for the link and/or descriptive text.

Figure 5:
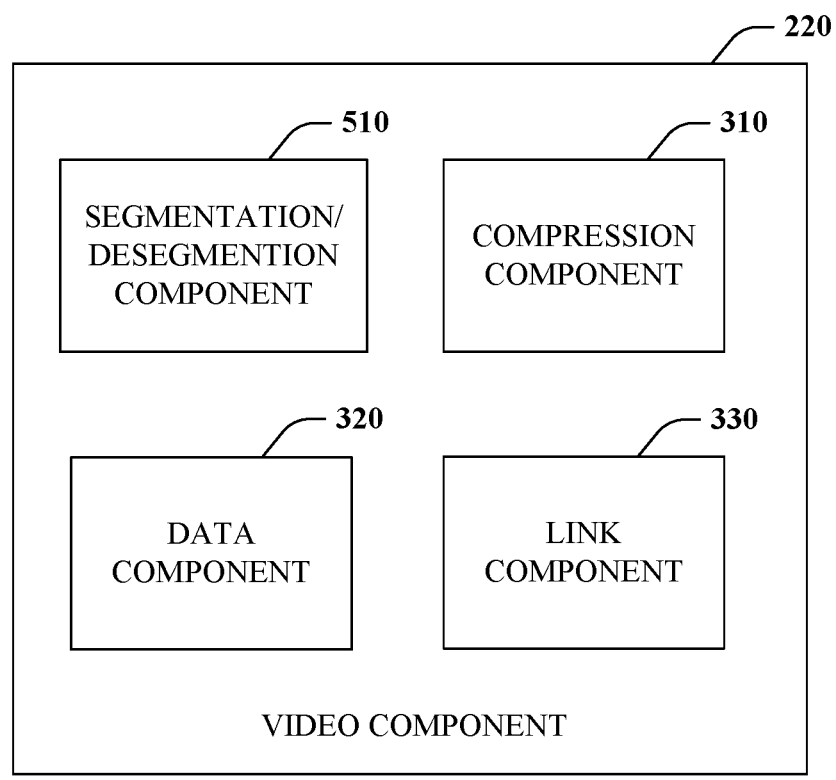
FIG. 5 is a block diagram of an exemplary video component according to an aspect of the disclosure.
Figure 6:
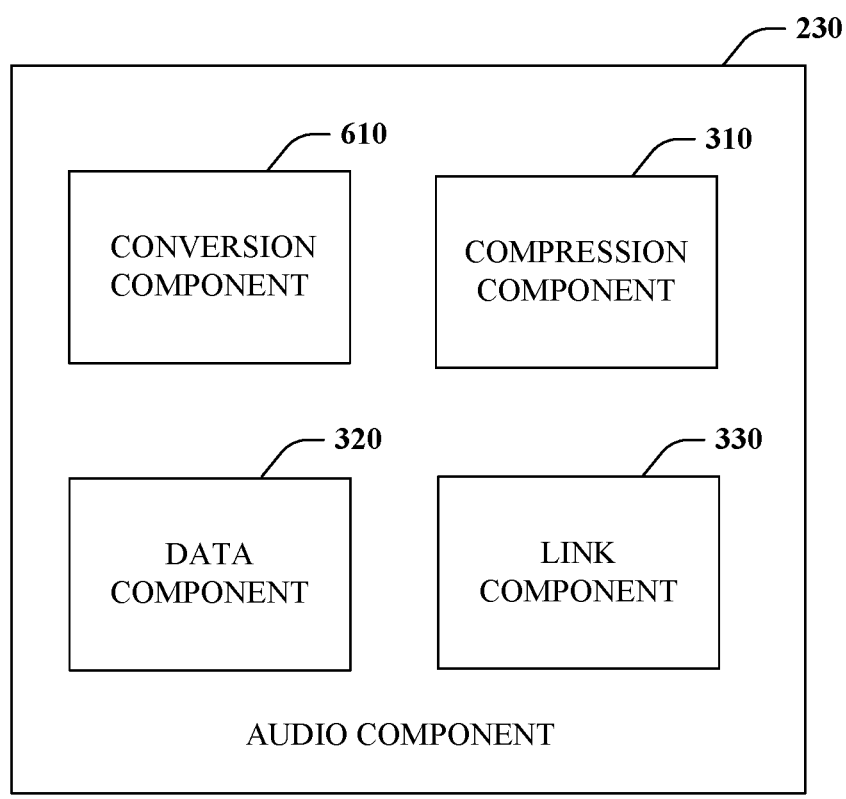
FIG. 6 is a block diagram of an exemplary audio component in accordance with a disclosed aspect.

Turning to FIG. 5, an exemplary video component 220 that scales message video content is illustrated in accordance with an aspect of the claimed subject matter. The video component includes a segmentation/de-segmentation component 510. The component 510 enables a video to be segmented or divided as well as de-segmented or combined. For example, a plurality of still images can be extracted from and employed to replace a video where pictures are supported but not videos. Similarly, audio can be removed from the video for separate transmission or in conjunction with a plurality of still images. Alternatively, audio can be recombined with still images, which can be merged in sequence to produce a video, slide show or the like.

Similar to the picture component 210, the video component 220 can also include analogous components such as compression component 310, data component 320, and link component 330. The compression component 310 can compress and decompress video to facilitate message communication with systems of with various video size constraints. The data component 320 can extract and combine text descriptive of a video. For example, metadata can be extracted from a video and utilized as a replacement or part of a replacement for a video. The link component 330 can facilitate replacement of a video with a link such as a URL or vice versa. For instance, rather than a video a link associated with the video can be employed where a messaging device does not support video. Of course, a message can also be up-scaled or enriched by substituting a video for a link thereto where a device supports video messaging.

Audio component 230 includes a conversion component 610, among other things, to convert audio to an appropriate form given messaging system and/or device constraints. In one embodiment, the conversion component 610 can employ known audio to text and/or text to audio technology. In this manner, if a message receiver does not support audio, text conversion of the audio can be employed to transforms an audio clip to text. In the context of up scaling rather than downscaling, audio conversion can be utilized to transform text to audio.

The audio component 230 also includes other analogous media components including compression component 310, data component 320, and link component 330. The compression component 310 can employ audio compression and decompression technologies aid scaling based on message size limitations. The data component 320 can operate to extract and inject data descriptive of a piece of audio. For example, a file title and associated metadata can be captured or introduce with respect to a particular audio clip or the like. The link component 330 enables a piece of audio be replaced by a link such as a URL to a source of the audio. In one instance, the link component 330 can facilitate storage of communicated audio and generating a reference thereto. Alternatively, the link component 330 can acquire a referenced piece of audio by following the link and embed the audio into a message instead of or in addition to the link.

Returning to FIG. 2, it is to be appreciated that all or some components comprising the media component 212, namely picture component 210, video component 220, and audio component 230, among other can interact to scale a message or message content. By way of example, not limitation, consider a scenario in which a sender includes a video in a message not supported by a receiver. The video component 220 can segment the media into visual and audio portions. The visual portions, which comprise a number of still images produced by the video component 220, can be further scaled using picture component 210 to compress the pictures, for instance. Further, the audio component 230 can transform the audio portion into text, which can then be associated with each related still image.

The fidelity scale component 140 can also include a number of other components that can use similar technology or techniques employed with respect to media component 212. In particular, the scale component 140 includes a web page component 240, map component 250, and emoticon component 260.

The web page component 240 enables scaling with respect to web pages, WAP (Wireless Application Protocol) pages, or the like embedded in a message. As per fidelity degradation, the web page component 240 can transform the page to an image of the page where image support is available. Additionally or alternatively, a link to the web page can be inserted to enable a user to access communicated content. Further yet, data and/or metadata can be extracted from the web page title, headers, and/or key words and provided as text. Of course, a message can be enriched when provided with of various forms by actually identifying a reference web page and embedding it within a message.

The map component 250 aids scaling of message maps. Since maps can be presented as web pages or images, among other things, along with text, many of the same techniques applied with respect to web page component 240 and picture component 210 can be applied. In one instance, compression can be applied to reduce the size of a map to allow the map to be communicated. A link such as a URL associated with a map can also be utilized in place of a map or in addition to an image of the map, for instance. Additionally or alternatively, information can be extracted from a map and utilized to provide descriptive text that captures the essence of the map such as an identified location and surrounding areas. Such information can be gathered from data associated with the map and/or from another source utilizing data forming part of the map to locate the data. In one particular instance, the map component 250 can communicate with mapping and/or GPS (Global Positioning System) applications to provide turn-by-turn directions from a device user's current position to a particular location identified on a map in text or some other form. Like other components of the scale component 140, the map component can be employed to enrich or degrade message content related to maps. Accordingly, note that the map component 250 can embed a map in a message in place of or in addition to other communication concerning a place or location. For example, where an address is sent via message to a recipient whose device supports embedded maps, a map of the location can be injected to facilitate communication.

The emoticon component 260 provides scaling of different types of emoticons, which provide a mechanism for expressing emotion, among other things. Emoticons can take various forms include text, graphical, and image based. Further, some emoticons can also include animation. Consequently, emoticon component 260 enables various kinds of emoticons to be replaced by others to facilitate communication in accordance with support provided therefor. For example, text or ASCII (American Standard Code for Information Interchange) emoticons (e.g., :-), :-( . . . ) can be replaced by graphical and/or image based representation where supported. Of course, where animated emoticons are employed other representations can be converted back and forth to enrich or degrade message content.

As previously mentioned, in accordance with an aspect of the claimed subject matter, the fidelity scale component 140 can be employed to facilitate communication by way of up scaling or down scaling message content to a supported level of message richness. While this can be performed automatically, it is also to be noted that user defined settings can affect scaling. For example, if a user has a preference for particular types of message such as text only, text and pictures, or text, pictures and video, amongst other combinations, despite messaging capabilities, scaling can be employed to implement those preferences. Furthermore, a device or other mechanism can influence scaling as a function of current processing load, memory constraints, and/or network latency, among other things.

Figure 7:
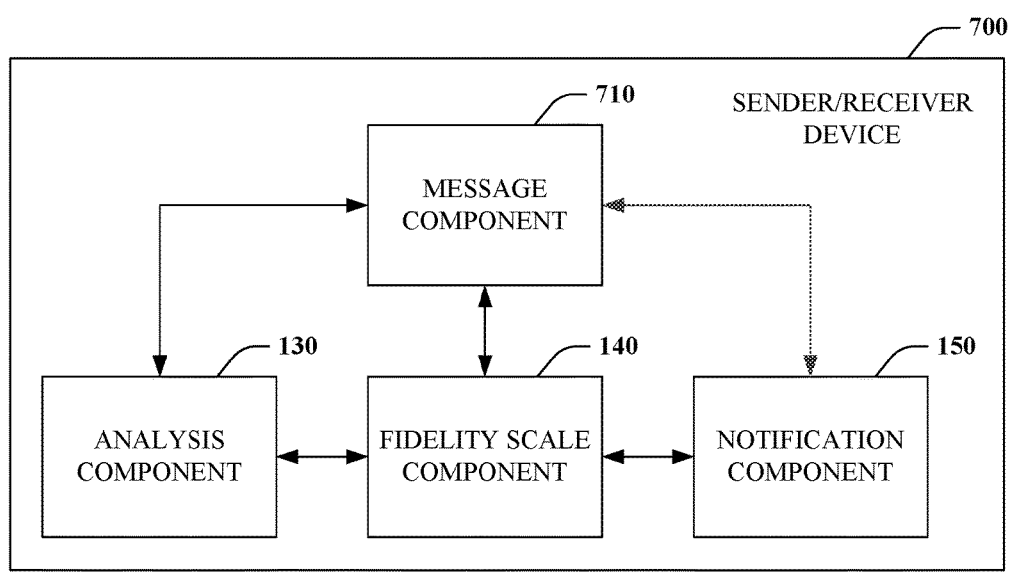
FIG. 7 is a block diagram of a sender/receiver device including fidelity scaling functionality according to an aspect of the disclosure.

While fidelity scaling can occur external to a device, for example on a server associated with a mobile device service provider, it is also to be appreciated that a sender/receiver device 700 can include such functionality as depicted in FIG. 7. Sender/receiver device 700 provides functionality for both sending and receiving communication at different times. The device 700 includes a message component 710 that provide functionality associated with composing, sending, and receiving messages, amongst other conventional functionality. The message component or system 710 can define message richness by supported functionality. Although not limited thereto, in accordance with one aspect the message component 710 can combine SMS, MMS, IM, and e-mail type features into a cohesive system that can transmit across SMS and IP backbones in a manner that is transparent or without observable effect to end users. The analysis component 130, fidelity scale component 140, and notification component 150, as previously described, are all communicatively and/or functionally coupled to the message component 710 to enable scaling of messages or message content in accordance with an aspect of the claimed subject matter. In brief, the analysis component 130 can analyze or otherwise determine the capabilities of a receiving device and/or the richness of an acquired message. The fidelity scale component 140 can then scale a message up or down to facilitate communication in connection with supported message richness or fidelity. The notification component 150 can transmit a notification or indication that a message has been scaled and optionally how or what effect the scaling had on the message to either or both of a sender and receiver via the message component 710, for example.

The aforementioned systems, devices, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the fidelity scale component 140, or one or more sub-components thereof, can employ such mechanisms to infer or otherwise determine an appropriate or intelligent manner and/or extent of scaling. For instance, these mechanisms can be employed to help generate descriptive text associated with media as a function of provided data or metadata and/or utilizing to help generate concise and meaningful summaries by way of pictures and/or text of message audio or video.

Figure 8:
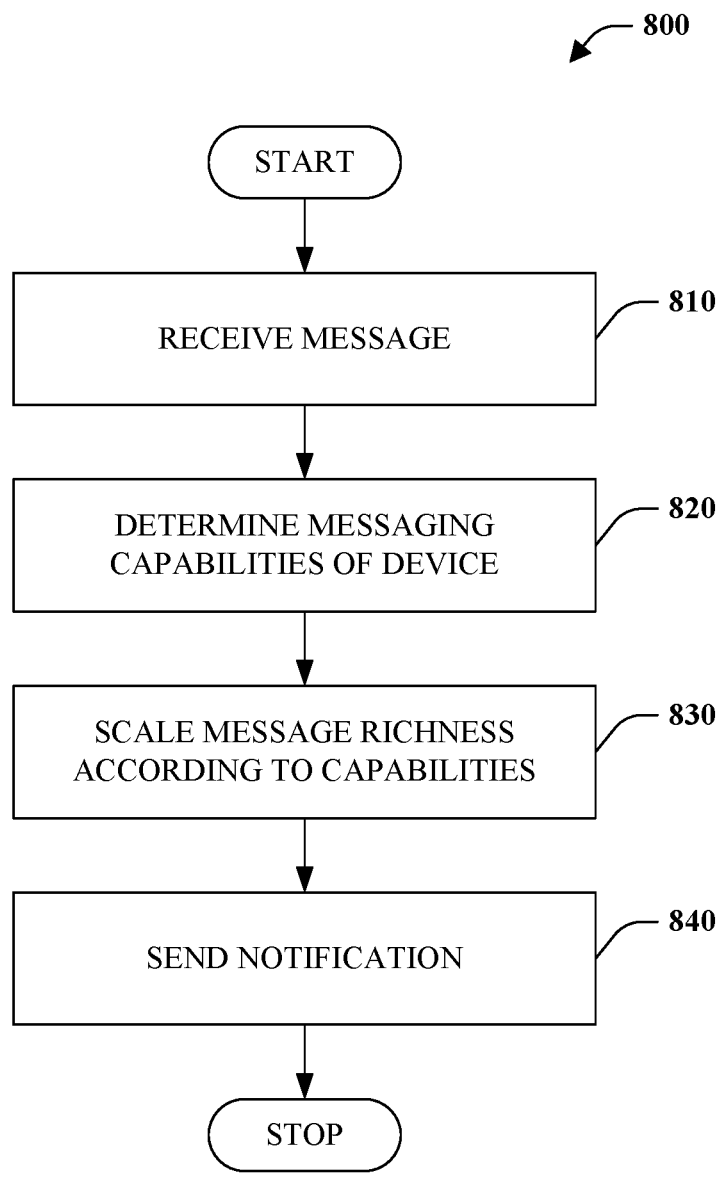
FIG. 8 is a flow chart diagram of a message scaling method in accordance with an aspect of the disclosed subject matter.
Figure 9:
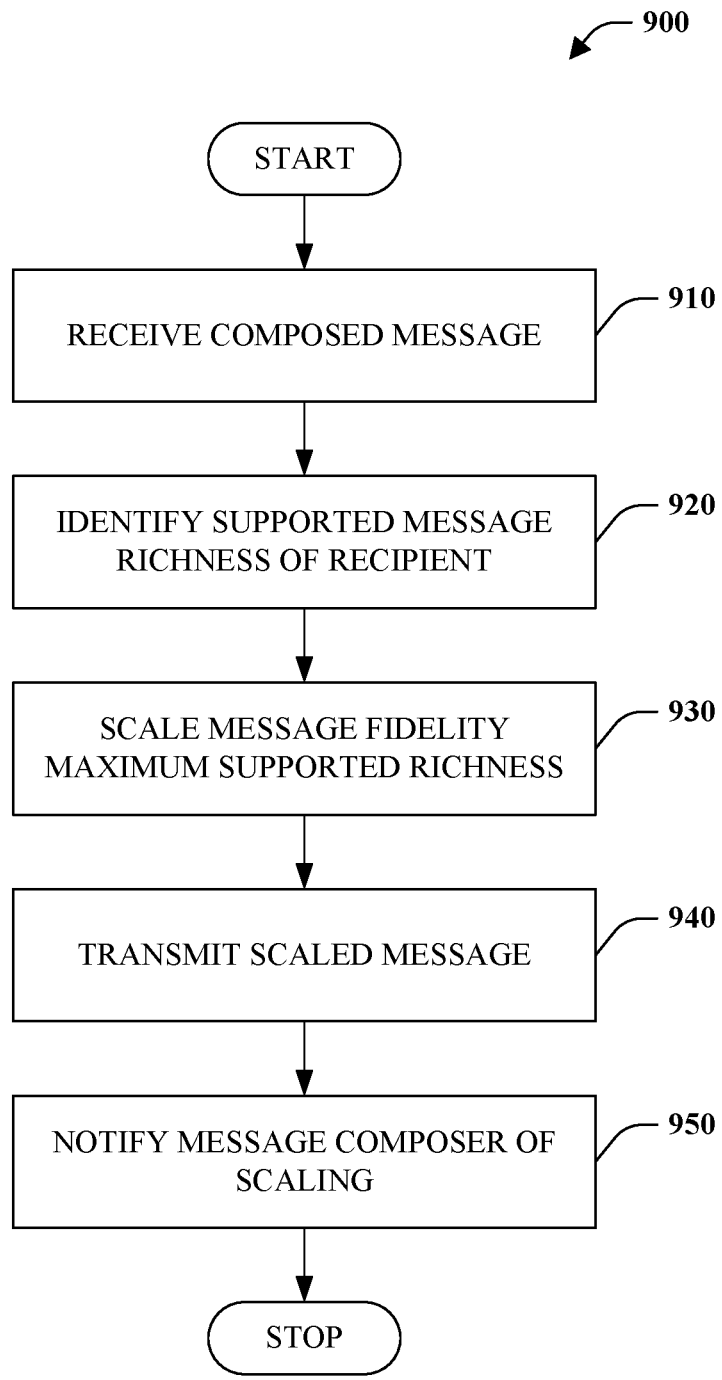
FIG. 9 is a flow chart diagram of a sender-side messaging method according to a disclosed aspect.
Figure 10:
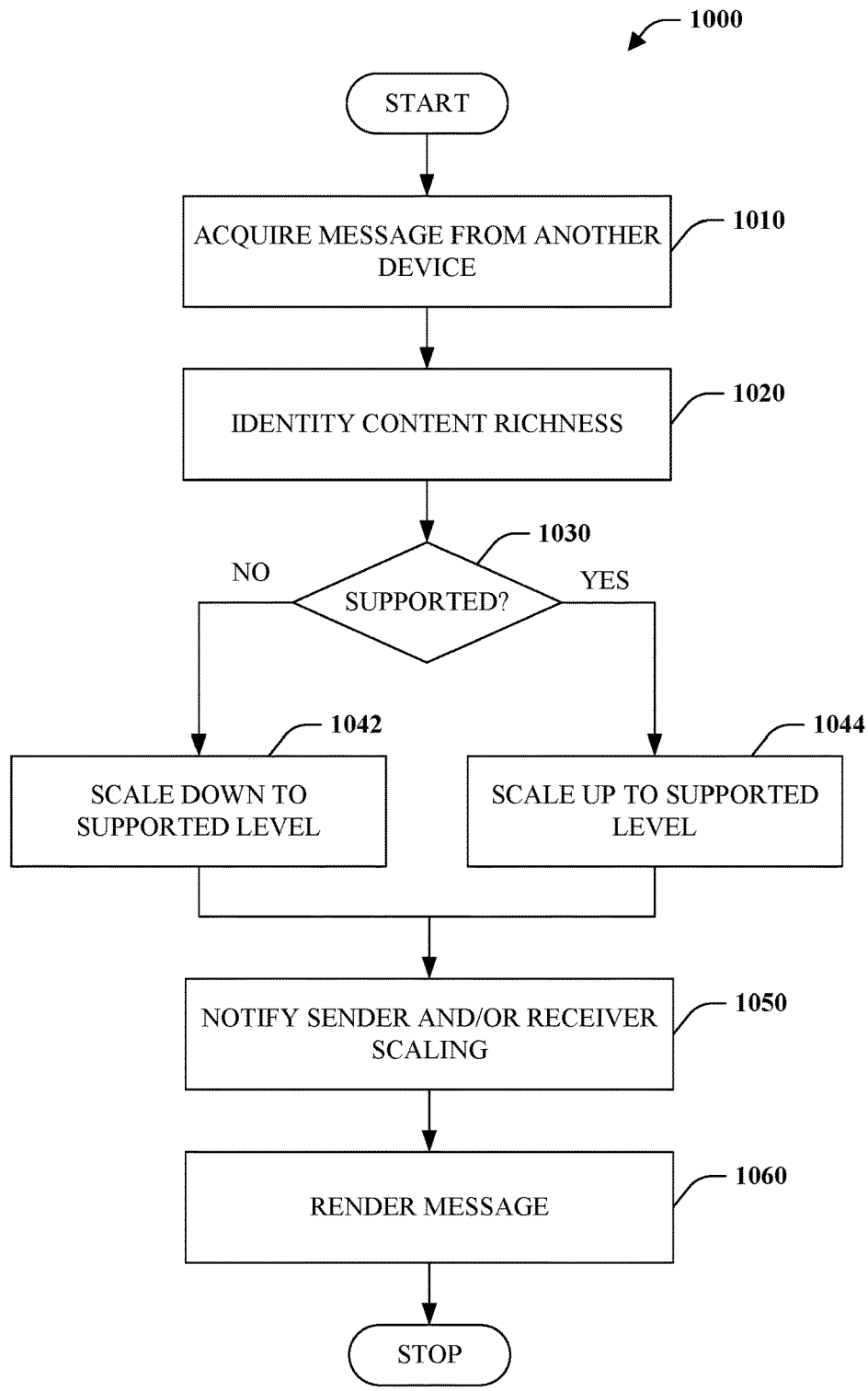
FIG. 10 is a flow chart diagram of a receiver-messaging method in accordance with an aspect of the disclosure.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a message scaling method 800 is illustrated in accordance with an aspect of the claimed subject matter. At reference numeral 810, a message is received, retrieved, or otherwise identified. The message can correspond to an electronic threaded communication that is transmitted substantially instantaneously, for example in a manner analogous to SMS/MMS or IM. The message can include text, images, audio, video, web pages, maps, and/or emoticons, among other things. At numeral 820, the capabilities of a communication device are determined. The determination concerns the richness of messages or message content able to be processed. For example, support can be provided for one or more of text, images, audio, video, web pages, and maps, among other things. At reference 830, the message is scaled in accordance with capabilities of the device. In accordance with one aspect, the message can be scaled to the maximum fidelity enabled by the device. However, scaling can also be influenced by other factors including but not limited to user preferences. In addition, it is to be appreciated that scaling can operate to scale down or degrade a message, or scale up or enrich a message. Further yet, scaling can be down in an intelligent manner to facilitate communication. At reference 840, a notification is sent to a message sender and/or receiver indicating that the message has been altered and optionally how it was altered. Notification can be effected in a variety of different ways including but not limited to injected message text and/or a new message. Among other things, notification can facilitate conversation by alerting communicating parties that the message received is not of the same form as that sent thereby avoiding any confusion, for example.

While not limited thereto, in accordance with one aspect of the claimed subject matter, the method 800 can be performed on a server and/or in a distributed environment. For example, a server associated with a content or data service provider can acquire messages from sender devices, perform scaling in accordance with method 800, and subsequently transmit the scaled message as well as notification to a receiver device. Furthermore, scaling can be embodied as a network or web service employed by a device and/or content service provider.

FIG. 9 is a method of sender-side messaging 900 in accordance with an aspect of the claimed subject matter. At reference numeral 910, a composed message is received, retrieved, or otherwise acquired. At numeral 920, supported message richness or fidelity of a message recipient is identified, determined, inferred or the like. For example, the recipient device can communicate such information upon request or a sender can reference information stored about previous interactions with the same or like device. Further yet, a server and/or service can be contacted to aid identification of recipient capability.

At numeral 930, the composed message is scaled in accordance with the maximum level of fidelity supported by the recipient device. Of course, various preferences or other issues can affect the scaling such that the maximum is not always accomplished. Up or down scaling can be accomplished with respect to various types of message content including text, images, audio, video, web pages, maps, and/or emoticons among other things Media can be scaled in similar manners such as via compression/decompression, descriptive data extraction/injection and link insertion and realization. Further, audio can be converted to text and video to still images or vice versa. Similar scaling can occur with respect to specific content such as web pages, which can be converted to images and optionally accompanied by descriptive data and a link, for example.

Subsequently, at numeral 940, scaled messages can be transmitted to a target receiver device. These scaled messages can correspond to actual transformation of the original message or generation of a new scaled version, among other things At reference numeral 950, notification can be provided of the scaling. For instance, prior to transmitting the message such notification can be included with the scaled message. Further, the sender can also be notified to avoid confusion when a composed message is not communicated as composed but rather in a different form or format.

FIG. 10 illustrates a method of receiver-sent messaging 1000 in accordance with an aspect of the claimed subject matter. At reference numeral 1010, a message is received or acquired from another communication device. In accordance with one non-limiting embodiment, the message can be a thread style message where transmission and interaction are substantially instantaneous. In other words, the message can correspond to one or more variations of text messages or instant messages.

At numeral 1020, the message is analyzed to determine content richness or fidelity. Richness or lack thereof can be determined as a function of supported message content, among other things. For instance, a message that includes solely text is not as rich as one that also includes pictures. Similarly, a message that includes audio and video in addition to text and pictures is still richer yet. Accordingly, there is a level of content richness that can be associated with the received message.

A determination is made at reference 1030 as to whether the content is supported by the receiving device. In other words, the question is whether or not the device supports the at least the same level of richness as the message communicates. If it does not ("No"), the message can be scaled down to the level of richness or fidelity supported by the device at reference 1042. If at least the same level of richness is supported an attempt can be made to scale up the communicated message. If this is not possible or it is undesirable (e.g., based on user preferences), the method can simple pass through to 1060. Otherwise, the method continues at 1050.

At reference numeral 1050, a sender can be notified that their message was scaled by the receiver. Optionally, the style, kind or type, and extent of scaling can be communicated. For example, the notification can be "Recipient does not support audio accordingly the content was scaled to text" or "Recipient scaled up content from a URL to the image pointed to by the URL." Such notification can be communicated as part of a sent designated message perhaps sent and received behind the scenes or injected within a reply message, among other things.

At reference numeral 1060, the scaled message is rendered by the device and/or associated messaging component/system. Furthermore, it is to be appreciated that rending can include injection of a notification regarding scaling of the rendered message. Subsequently, the method can terminate.

As used in this application, the terms "component," "system," "device" and the like are intended to refer to a processor-based entity (e.g., computer, mobile communication device, . . . ), either hardware, a combination of hardware and software, software, or software in execution. For example, a component may be, but is not limited to being, a process running on a processor, a processor, an object, an instance, an executable, a thread of execution, a program, and/or a computer or other processor based device. By way of illustration, and not limitation, both an application running on a computer and the computer can be a component. One or more components can reside within a process and/or thread of execution and a component may be localized on one processor-based devices and/or distributed between two or more devices.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
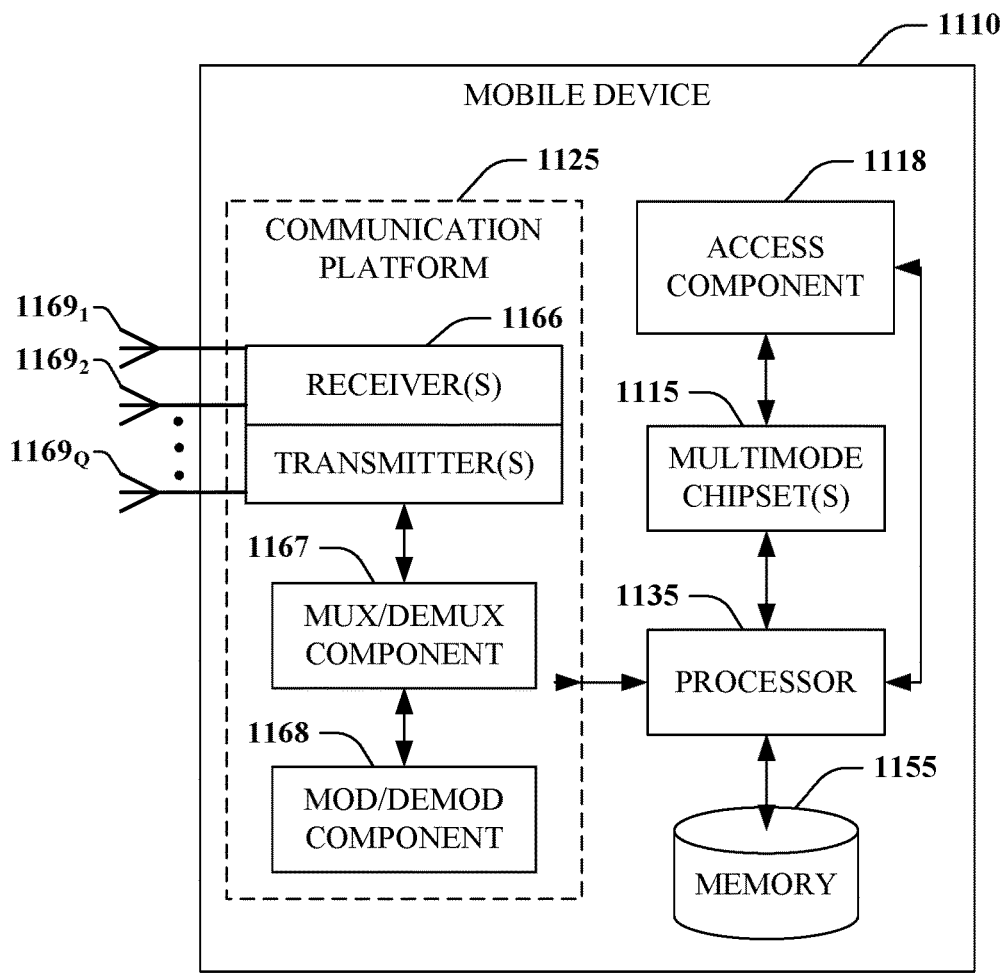
FIG. 11 is a schematic block diagram illustrating a suitable mobile operating environment for aspects of the subject disclosure.
Figure 12:
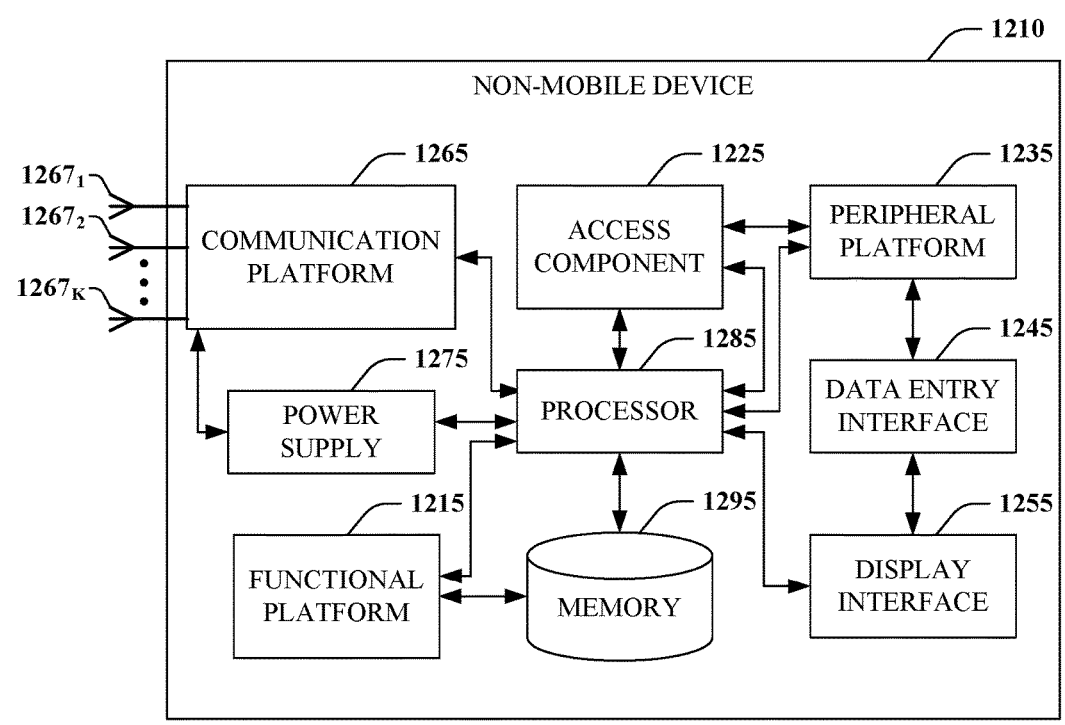
FIG. 12 is a schematic block diagram illustrating a suitable non-mobile operating environment for aspects of the subject disclosure.
Figure 13:
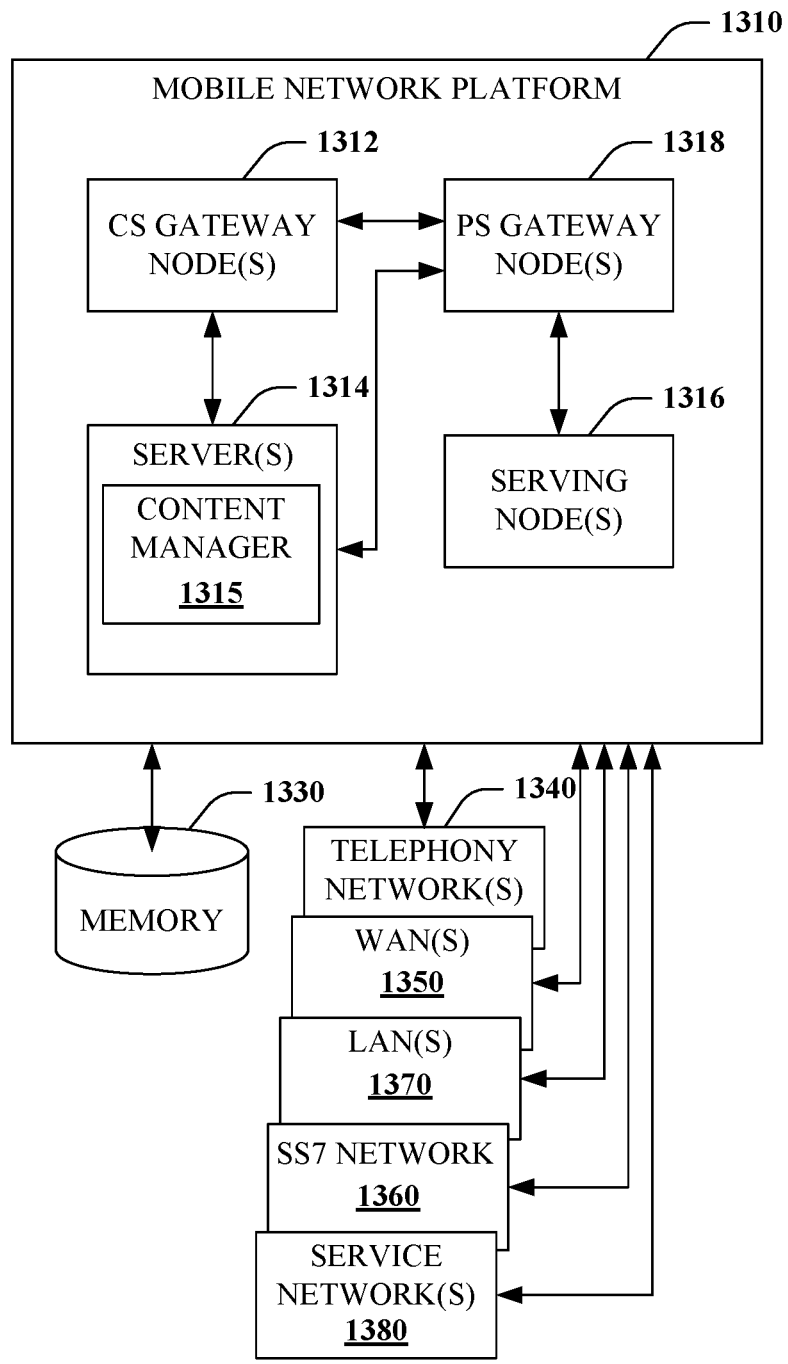
FIG. 13 is a schematic block diagram of a sample mobile network platform for aspects of the disclosed subject matter.

In order to provide a context for the various aspects of the disclosed subject matter, FIGS. 11-13 as well as the following discussion are intended to provide a brief, general description of suitable environments in which the various aspects of the disclosed subject matter can be implemented. FIG. 11 illustrates a block diagram of an example embodiment of a mobile device 1110 that can be employed with respect to fidelity scaling in accordance with aspects described herein. FIG. 12 presents a block diagram of an example embodiment of a non-mobile device 1105, which can be provisioned through a non-mobile network platform and employed in accordance with aspects described herein. Further, FIG. 12 presents an exemplary embodiment of a mobile network platform 1210 that can provide content management service in accordance with aspects described herein.

Mobile device 1110, which can be a multimode access terminal, includes a set of antennas $1169_1$-$1169_Q$ (Q is a positive integer) that can receive and transmit signal(s) to and from wireless devices like access points, access terminals, wireless ports and routers, and so forth, that operate in a radio access network. It should be appreciated that antennas $1169_1$-$1169_Q$ are a part of communication platform 1125, which comprises electronic components and associated circuitry that provide for processing and manipulation of received signal(s) and signal(s) to be transmitted such as receivers and transmitters 1166, mux/demux component 1167, and mod/demod component 1168.

Multimode operation chipset(s) 1115 allows mobile device 1110 to operate in multiple communication modes in accordance with disparate technical specification for wireless technologies. In accordance with one aspect, multimode operation chipset(s) 1115 utilize communication platform 1125 in accordance with a specific mode of operation (e.g., voice, Global Positioning System (GPS)). In another aspect, multimode operation chipset(s) 1115 can be scheduled to operate concurrently (e.g., when Q>1) in various modes or within a multitask paradigm.

Mobile device 1110 includes access component 1118 that can convey content(s) or signaling in accordance with disclosed aspects. It should be appreciated that access component 1118, can include a display interface that render content in accordance with aspects of an interface component (not shown) that resides within access component 1118.

Mobile device 1110 also includes a processor 1135 configured to confer functionality, at least in part, to substantially any electronic component within mobile device 1110, in accordance with aspects of the disclosure. As an example, processor 1135 can be configured to execute, at least in part, instructions in multimode operation chipset(s) that afford multimode communication through mobile device 1110 like concurrent or multi-task operation of two or more chipset(s). As another example, processor 1135 can aid mobile device 1110 in receiving and conveying signaling and content(s) (e.g., various data flows) that are part of an active management act initiated by a subscriber that operates mobile 1110, or an approval cycle associated with auxiliary subscribers (e.g., secondary subscriber, tertiary subscriber . . . ). Moreover, processor 1135 enables mobile device 1110 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1155 can store data structures (e.g., metadata); code structure(s) (e.g., modules, objects, classes, procedures . . . ) or instructions; network or device information like policies and specifications, attachment protocols; code sequences for scrambling, spreading and pilot (e.g., reference signal(s)) transmission; frequency offsets, cell IDs, and so on.

The processor 1135 is functionally and/or communicatively coupled (e.g., through a memory bus) to memory 1155 in order to store and retrieve information necessary to operate and/or confer functionality, at least in part, to communication platform 1125, multimode operation chipset (s) 1115, access component 1118, and substantially any other operational aspects of multimode mobile 2010.

FIG. 12 is a block diagram of an exemplary embodiment of a non-mobile device 1210 that can convey content(s) and exploit various aspects of content transaction(s), among other things. Device 1210 includes a functional platform 1215 that comprises a set of components (not shown) that provide, at least in part, one or more specific functionalities of the non-mobile device 2110. Additionally, non-mobile device 2110 includes an access component 1225 that operates in accordance with aspects previously described (e.g., 1118 of FIG. 11). Moreover, in one aspect, non-mobile device 1210 can include a communication platform 1265 that can provide wireless communication capabilities in addition, or alternatively, to connectivity of non-mobile device 1210 through wired links (e.g., Ethernet, USB, GPIB, RS-232, FireWire, optical or coaxial cable connection to a network interface such as network interface 176, or router (not shown)). With respect to wireless capability, in non-mobile device 1210, which can be a multimode access terminal, a set of antennas $1267_1$-$1267_P$ (P is a positive integer) can receive and transmit signal(s) to and from wireless devices like access points, access terminals, wireless ports and routers, etc., that operate in a radio access network. Communication platform 1265 can exploit the set of "P" antennas $1267_1$-$1267_K$, (K is a positive integer) to establish communication within various modes such as single-input single-output, or multiple-input multiple output. Furthermore, communication platform 1265 can comprise various electronic components and associated circuitry that enable processing and manipulation of received signal(s) and signal(s) to be transmitted. In accordance with one aspect, the communication platform 1265 can be embodied in a modem.

Non-mobile device 1210 also includes a peripheral component 1235 that can include, or facilitate connection to, additional devices such as printer(s), media player(s), wireless router(s) (e.g., network interface), biometrics touch-pad (s), etc. According to one aspect, to afford such connectivity, peripheral component 1235 can include jacks for one or more of Ethernet, USB, GPIB, RS-232, FireWire, optical or coaxial cable connectors.

Display interface 1255 can enable rendering of content. In an aspect, display interface 1255 can be a liquid crystal display (LCD), a plasma panel, a monolithic thin-film based electrochromic display, amongst others. Additionally, display interface 1255 can be a part of functional platform 1215 (e.g., when non-mobile device 1210 is a PC, an IPTV (Internet Protocol TV) interface, a mobile device, a back projector component, a data projector . . . ).

It should be appreciated that non-mobile device 1210 also can include a data entry interface 1245 that can allow an end user to (i) command non-mobile device 1210 via configuration of functional platform 1215, (ii) deliver content(s) or signaling in accordance with aspects described herein, or (iii) generate content(s) (e.g., images via a built-in camera) or directive(s), among other things.

Power supply 1275 can power-up device 1210 and substantially any component included thereon. It should be appreciated that alternative or additional embodiments of device 1210 may not include power supply 1275 but rather be powered via attachment to a conventional power grid.

The non-mobile device 1210 includes processor 1285 which can be communicatively and/or functionally coupled (e.g., through a memory bus) to memory 1295 in order to store and retrieve information necessary to operate and/or confer functionality, at least in part, to access component 1225, and substantially any component(s) thereon in accordance with aspects described herein; functional platform 1215; communication platform 1265 when non-mobile device 1210 includes it; and substantially any other component of non-mobile device 1210. With respect to access component 1225, and components thereon, processor 1285 can be configured to execute access protocols to convey credentials and gains access to a content management service to convey multimedia content(s) or signaling, among other things. In addition, in connection with communication platform 1265, processor 1285 can be configured to confer functionality to substantially any electronic component within communication platform 1265. Moreover, processor 1285 enables communication platform 1265 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1295 can retain multimedia content(s), in accordance with aspects of the subject innovation, or security credentials (e.g., passwords, encryption keys, digital certificates . . . ) that facilitate access to a content management service. In addition, memory 1255 can store data structures (e.g., metadata); code structure(s) (e.g., modules, objects, classes, procedures . . . ) or instructions, or substantially any type of software or firmware that processor 1285 can execute to provide functionality associated with functional platform 1215; network or device information like policies and specifications; code sequences for scrambling, spreading and pilot (e.g., reference signal(s)) transmission; amongst others.

As indicate supra, FIG. 13 presents an example embodiment of a mobile network platform 1310 that can provide a content management service for content(s) and signaling in accordance with aspects described herein. Generally, mobile network platform 1310 can include components, such as, nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In accordance with one aspect, a component within a PS domain of network platform 1310 can be employed to effect communication among sources of content(s) in accordance with aspects described herein.

With respect to CS communication, mobile network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Circuit switched gateway node(s) 1312 can authorize and authenticate traffic (e.g., voice) arising from such networks. Additionally, CS gateway node(s) 1312 can access mobility, or roaming, data generated through SS7 network 1360; for instance, mobility data stored in a visitation location register (VLR), which can reside in memory 1330. Moreover, CS gateway node(s) 1312 interfaces CS-based traffic and signaling and gateway node(s) 1318. As an example, in a 3GPP UMTS network, CS gateway node(s) 1312 can be embodied, at least in part, in gateway GPRS support node(s) (GGSN).

In addition to receiving and processing CS-switched traffic and signaling, PS gateway node(s) 1318 can authorize and authenticate PS-based data sessions with served mobile devices, non-mobile devices, amongst others through femto cell access points. Data sessions can include traffic, or content(s), exchange with networks external to the mobile network platform 1310, like wide area network(s) (WANs) 1350 or service network(s) 1380; it should be appreciated that local area network(s) (LANs) 1370 can also be interfaced with mobile network platform 1310 through PS gateway node(s) 1318.

Packet-switched gateway node(s) 1318 generate packet data contexts when a data session is established. To that end, in an aspect, PS gateway node(s) 1318 can include a tunnel interface (e.g., tunnel termination gateway (TTG) in 3GPP UMTS network(s) (not shown)) which can facilitate packetized communication with different wireless network(s), such as femto network platform and associated radio access network, Wi-Fi networks. It should be further appreciated that the packetized communication can include multiple flows that can be generated through service (e.g., provisioning) and application server(s) 1314. It is to be noted that in 3GPP UMTS network(s), PS gateway node(s) 1318 (e.g., GGSN) and tunnel interface (e.g., TTG) comprise a packet data gateway (PDG).

The mobile network platform 1310 also includes serving node(s) 1316 that convey various packetized flows of data streams, received through PS gateway node(s) 1318. As an example, in a 3GPP UMTS network, serving node(s) 1316 can be embodied in serving GPRS support node(s) (SGSN).

Server(s) 1314 in mobile network platform 1310 can execute numerous applications (e.g., location services, online gaming, wireless banking, wireless device management . . . ) that can generate multiple different packetized data streams or flows, and manage (e.g., schedule, queue, format . . . ) such flows. Such application(s), for example, can include add-on features to standard services provided by mobile network platform 1310. Data streams can be conveyed to PS gateway node(s) 1318 for authorization/authentication and initiation of a data session, and to serving node(s) 1316 for communication thereafter. It should be appreciated that PS gateway node(s) 1318 associated with a macro network platform can authorize, or grant access, to content management service, and PS gateway node(s) 1318 associated with a femto network platform can carry out communication with serving node(s) 1316 related to a femto network platform. Server(s) 1314 can also effect security (e.g., implement one or more firewalls) of mobile network platform 1310 to ensure network's operation and data integrity in addition to authorization and authentication procedures that CS gateway node(s) 1312 and PS gateway node(s) 1318 can enact. Moreover, server(s) 1314 can provision services from external network(s), such as WAN 1350 or Global Positioning System (GPS) network(s) (not shown). It is to be noted that server(s) 1314 can include one or more processors configured to confer at least in part the functionality of macro network platform 1310. To that end, the one or more processors can execute code instructions stored in memory 1330, for example. It is should be appreciated that server(s) 1314 can include a content manager 1315, that provides content management service. To at least that end, content manager 1315 includes issues subscription(s) to the content management service.

Memory 1330 can store information related to operation of mobile network platform 1310. Information can include content(s) received from various sources of content(s), subscriber account(s) and associated credential(s), and delivery settings(s), additional subscriber data; pricing schemes, such as promotional rates, flat-rate programs, and/or couponing campaigns, amongst others. Memory 1330 can also store information from at least one of telephony network(s) 1340, WAN 1350, LAN 1370, SS7 network 1360, or service network(s) 1380.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:
1. A system, comprising:
  a processor; and
  a memory that stores executable instructions that, when executed by the processor, facilitate performance of operations, comprising:
    in response to receiving message data that is to be directed from a first communication device to a second communication device and based on a type of the second communication device, modifying the message data to enable a change in fidelity of media within the message data such that the media is compressed to at least a pre-programmed limit based at least partly on the type of the second communication device;
    in response to the modifying, generating notification data that specifies that the fidelity of media within the message data has been changed; and
    transmitting the notification data and the modified message data to the second communication device.

2. The system of claim 1, wherein the operations further comprise:
receiving the type of the second communication device from the second communication device.

3. The system of claim 1, wherein the operations further comprise:
receiving the type of the second communication device from a data store comprising data associated with a wireless carrier service agreement for the second communication device.

4. The system of claim 1, wherein the operations further comprise:
determining the type of the second communication device based on historical data indicative of an interaction with the second communication device.

5. The system of claim 1, wherein the modifying comprises increasing the fidelity of the media.

6. The system of claim 1, wherein the modifying comprises decreasing the fidelity of the media.

7. The system of claim 1, wherein the message data comprises video data and the modifying comprises converting the video data to text data that is indicative of a textual description of the video data.

8. The system of claim 1, wherein the message data comprises video data and the modifying comprises converting the video data to image data indicative of a frame of video comprised in the video data.

9. The system of claim 1, wherein the message data comprises image data indicative of an image and the modifying comprises converting the image data to text data that is indicative of a textual description of the image.

10. The system of claim 1, wherein the message data comprises map data representing an image of a map and the modifying comprises converting the map data to text data representing an aspect of the map comprised in the map data.

11. A method, comprising:
in response to receiving message data that is to be directed from a first communication device to a second communication device and, based on a type of the second communication device and a scaling preference indicator, modifying, by a system comprising a processor, the message data to control a level of detail of the message data such that the message data is compressed to at least a pre-programmed limit based at least partly on the type of the second communication device;
in response to the modifying the message data, determining, by the system, notification data that specifies that the level of detail of the message data has been changed; and
transmitting the notification data and the modified message data to the second communication device.

12. The method of claim 11, further comprising:
initiating, by the system, transmission of the message data, after modification, to the second communication device and enabling access to the notification data for the second communication device.

13. The method of claim 11, wherein the modifying comprises modifying the message data to increase content level detail.

14. The method of claim 11, wherein the modifying comprises modifying the message data to reduce content level detail.

15. The method of claim 11, further comprising:
receiving, by the system, the type of the second communication device from a data store of a wireless telecommunications carrier.

16. The method of claim 11, further comprising:
determining, by the system, the type of the second communication device from historical data related to an interaction with the second communication device.

17. A first device comprising:
a processor; and
a memory that stores executable instructions that, when executed by the processor, facilitate performance of operations, comprising:
in response to receiving first message data that is to be directed from the first device to a second device and, based on a type of the second device, converting the first message data to second message data, wherein the first message data and the second message data have different defined levels of media richness, wherein less rich media is associated with less advanced media features and wherein the first message data is compressed to at least a pre-programmed limit based at least partly on the type of the second device;
in response to the converting the first message data into the second message data, inserting, by the first device, an indication into the second message data representing that the second message data comprises a modified version of the first message data; and
transmitting the notification data and the modified message data to the second communication device.

18. The device of claim 17, wherein a first level of the different defined levels of media richness is less rich than a second level of the different defined levels of media richness.

19. The device of claim 17, wherein the type of the second communication device is determined from historical data related to a prior interaction by the first device with the second device.

* * * * *

UNITED STATES PATENT AND TRADEMARK OFFICE
CERTIFICATE OF CORRECTION

PATENT NO.       : 10,257,148 B2
APPLICATION NO.  : 15/147837
DATED            : April 9, 2019
INVENTOR(S)      : Kristin Marie Pascal It is certified that error appears in the above-identified patent and that said Letters Patent is hereby corrected as shown below:

In the Drawings

Drawing Sheet 5 of 13, Reference Number (510), Fig. 5, Line 2, change "DESEGMENTION" to --DESEGMENTATION--.

In the Specification

Column 4, Line 63, change "and or" to --and/or--.

Column 10, Line 23, change "things" to --things.--.

Column 10, Line 35, change "things Δt" to --things. At--.

In the Claims

Column 18, Line 32, Claim 17, change "features" to --features,--.

Signed and Sealed this
Ninth Day of July, 2019

Andrei Iancu
*Director of the United States Patent and Trademark Office*